United States Patent
Salk (12)

(10) Patent No.: US 6,280,029 B1
(45) Date of Patent: Aug. 28, 2001

(54) CUSTOMIZED CLIP-ON ACCESSORY FOR SPECTACLES

(76) Inventor: David E. Salk, P.O. Box 8550, Emeryville, CA (US) 94662

( * ) Notice: Subject to any disclaimer, the term of this patent is extended or adjusted under 35 U.S.C. 154(b) by 0 days.

(21) Appl. No.: 09/695,693

(22) Filed: Oct. 24, 2000

(51) Int. Cl.$^7$ ..................................................... G02C 9/00
(52) U.S. Cl. .............................................................. 351/47
(58) Field of Search .................................. 351/47, 48, 57, 351/80, 90, 92, 99, 101, 152, 178, 233

(56) References Cited

U.S. PATENT DOCUMENTS

| | | |
|---|---|---|
| 4,890,910 | 1/1990 | Gazeley . |
| 5,123,724 | 6/1992 | Salk . |
| 5,774,200 | 6/1998 | Markey . |
| 5,838,417 | 11/1998 | Dahan et al. . |
| 5,889,574 | 3/1999 | Gandl-Schiller . |
| 5,936,702 | 8/1999 | Cheong . |
| 6,007,197 | 12/1999 | Locatelli . |
| 6,089,706 | * 7/2000 | Pilat, Jr. ................................. 351/47 |

* cited by examiner

*Primary Examiner*—George Manuel
(74) *Attorney, Agent, or Firm*—Harris Zimmerman

(57) ABSTRACT

An improved construction for custom clip-on accessories for spectacles includes a pair of accessory lens components that are shaped to conform to the lenses of a pair of spectacles. A pair of clasp components are secured to upper edge portions of respective accessory lenses, and a bridge member joins the two upper clasps to form an assembly thereof. In addition, a pair of lower clasps are secured to lower edge portions of the respective accessory lenses. The upper and lower clasps include bracket portions that engage the frame (or, in frameless spectacles, the edges of the ophthalmic lenses) and removably retain the clip-on assembly to the spectacles. Each clasp includes a channel-like opening for receiving the edge portion of the accessory lens. The channel is formed of a stiff, form-retaining metal that may be crimped to contract onto the edge portion of the accessory lens. Moreover, a sharp, tooth-like projection extends into the channel opening from one side thereof, and is designed to penetrate and perforate the accessory lens. The projection prevents removal of the clasp as long as the channel opening remains crimped onto the edge portion, and this engagement obviates the need for any adhesive for joining the clasp to the accessory lens. As a result, a simple crimping operation replaces the prior art gluing step, and eliminates the need for any clean-up step following gluing.

15 Claims, 2 Drawing Sheets

CUSTOMIZED CLIP-ON ACCESSORY FOR SPECTACLES

BACKGROUND OF THE INVENTION

This invention relates to attachments for spectacles and more particularly to clip-on attachments that superimpose auxiliary optical elements in front of the lenses of spectacles.

The optical properties of a particular pair of eyeglasses are fixed at the time of manufacture. The needs of the owner of the eyeglasses with respect to vision correction or vision modification vary under different conditions. For example, reduction of light intensity as provided by sunglasses is desirable at certain times and locations but not at others. In some situations, such as where a person is operating a computer, a temporary increase in magnification can be helpful. Wearing of yellow tinted glasses can aid night vision but this may not be desirable during the daytime or in the presence of indoor lighting.

Obtaining two or more pairs of eyeglasses for use under different conditions is costly, particularly in the case of prescription eyeglasses that are fabricated to meet the specialized needs of the particular person. It is simpler and more economical to make use of attachments of the type that can be temporarily clipped onto the person's basic vision correcting eyeglasses at times when reduced light intensity or some other vision modification is needed. Clip-on devices may be manufactured in a range of sizes and optical effects (e.g., sunglasses, magnifiers, etc.) that are intended to engage the frame of a spectacle assembly. Prior clip-on eyeglass accessories of this kind have not been entirely satisfactory for several reasons. For example, eyeglasses are made in a variety of sizes and a variety of configurations, and these configurations tend to vary from time to time because of changes in fashion or the introduction of new materials. Many prior clip-on accessories are mass produced in one size and shape or a limited number of sizes and shapes. Consequently the optical elements of such accessories often do not have the same configuration and spacing as the lenses of the eyeglasses with which they are used. This disconformity can cause several problems. Undersized optical elements and optical elements that are out of register with the eyeglass lenses tend to disrupt the wearer's field of view and also present an unaesthetic appearance to others. Oversized optical elements may contact the wearer's skin in an irritating manner and have projecting edges that may promote dislodgement of the accessory from the eyeglasses.

One solution to these problems known in the prior art is the introduction of customized clipon accessories for eyeglasses, as described in U.S. Pat. No. 5,123,724, issued to the present inventor. The customized items employ accessory lenses cut or otherwise shaped to conform to the outer perimeter of the eyeglass lenses, and clasp components that are permanently secured to the accessory lenses. The clasp components include bracket portions that engage the frame or lenses of the eyeglasses, and a bridge member that joins the upper clasps and unites two accessory lenses into a single assembly. The custom accessory lenses and the choice of the proper bridge member length provides an exact fit that obviates many of the problems noted above.

The patented methodology calls for the use of an adhesive component to join the clasps to the peripheral edge portion of the accessory lens. Although this expedient works quite well, it has been found that the process of applying adhesive and then crimping the clasp onto the accessory lens may cause some of the adhesive to exude onto the accessory lens. This requires an additional cleanup step that must be carried out quickly, before the (usually fast-setting) adhesive cures or sets. There is a need in the prior art for a custom clip-on eyeglass accessory construction that overcomes this problem.

SUMMARY OF THE INVENTION

The present invention generally comprises an improved construction for custom clip-on accessories for spectacles. As in the previous patented clip-on construction referenced above, the invention includes a pair of accessory lens components that are shaped to conform to the lenses of a pair of spectacles. It also includes a pair of clasp components secured to upper edge portions of respective accessory lenses, and a bridge member joining the two upper clasps to form an assembly thereof. In addition, a pair of lower clasps are secured to lower edge portions of the respective accessory lenses. The upper and lower clasps include bracket portions that engage the frame (or, in frameless spectacles, the edges of the ophthalmic lenses) and retain the clip-on assembly to the spectacles.

A significant aspect of each clasp of the invention is the provision of a channel-like opening for receiving the edge portion of the accessory lens. The channel is formed of a stiff, form-retaining metal that may be crimped to contract onto the edge portion of the accessory lens. Moreover, a sharp, tooth-like projection extends into the channel opening from one side thereof, and is designed to penetrate and perforate the edge portion. The projection prevents removal of the clasp as long as the channel opening remains crimped onto the edge portion, and this engagement obviates the need for any adhesive for joining the clasp to the accessory lens. As a result, a simple crimping operation replaces the prior art gluing step, and eliminates the need for any clean-up step following gluing.

DESCRIPTION OF THE PREFERRED EMBODIMENTS

The present invention generally comprises an improved construction for custom clip-on accessories for spectacles. The basis for the improved construction is found in U.S. Pat. No. 5,123,724, which is incorporated herein by reference.

Figure 1:
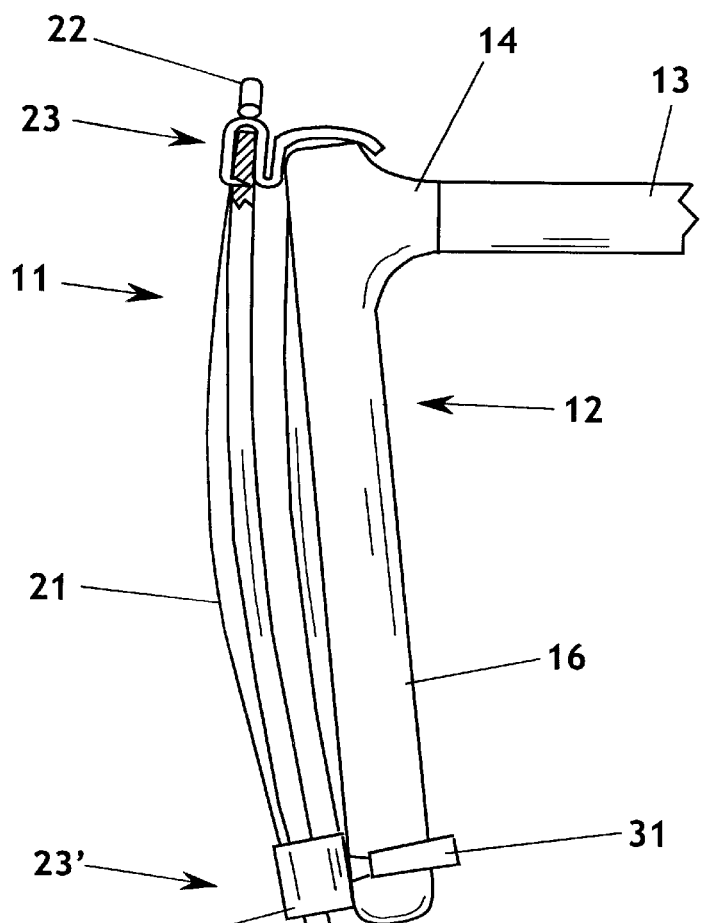
FIG. 1 is a side elevation of the improved clip-on eyeglass accessory assembled to a typical eyeglasses frame.

With regard to FIG. 1, the clip-on eyeglasses accessory 11 of the invention is designed to be removably secured to a typical eyeglasses assembly 12 known in the prior art. The assembly 12 generally includes a temple bar 13 secured by a hinge to a spectacle frame 14 that includes a pair of lens-supporting portions 16 (only one is shown in the figure). An ophthalmic lens 17 is provided with a refractive correction prescribed for an individual. The accessory 11 has a pair of auxiliary optical elements 21 which are trimmed to have perimeters that conform substantially with the lens regions 16 of the frame 14. A bridge member 22 extends between the pair of optical elements 21 to join them in a unified assembly.

A clasp 23 is secured to each of the optical elements 21 at an upper edge portion thereof. With regard to FIGS. 2 and 3, the clasp 23 includes a U-shaped channel portion 24 defining an internal gap 26 dimensioned to receive an edge portion of an auxiliary optical element 21. Extending from an outer edge of the channel portion 24 is a sharp, tooth-like projection 27. The projection 27 is provided to secure the clasp 23 to the auxiliary optical element 21 in a simple crimping operation. That is, the gap 26 is initially large enough to receive the edge portion of the optical element 21. Thereafter, the channel portion 26 is compressed by a pliers-like tool to diminish the gap 26 and drive the projection 27 to penetrate and perforate the edge portion of the optical element 21. The clasp 23 is formed of a stiff, form-retaining metal, and the perforate engagement of the projection 27 in the optical element secures the clasp to the optical element in a generally non-removable manner. (Removal may be carried out using tools to re-open the channel 26, but normal use and wear cannot disengage the clasp from the optical element 21.) The optical element 23 is preferably formed of a strong, optical quality plastic or polymer such as polycarbonate or the like that can withstand the perforation step by the projection 27.

Figure 2:
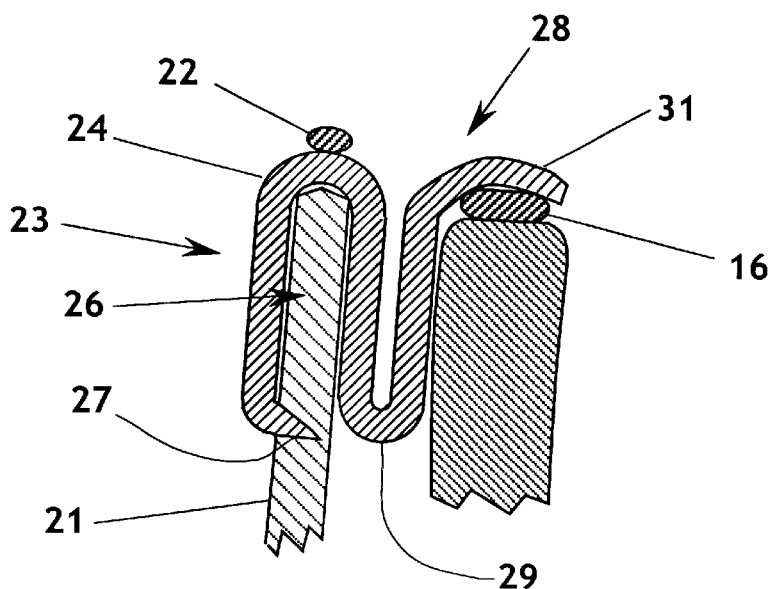
FIG. 2 is an enlarged cross-sectional side elevation showing the improved clasp of the invention joined to an accessory lens and to an eyeglasses assembly.
Figure 3:
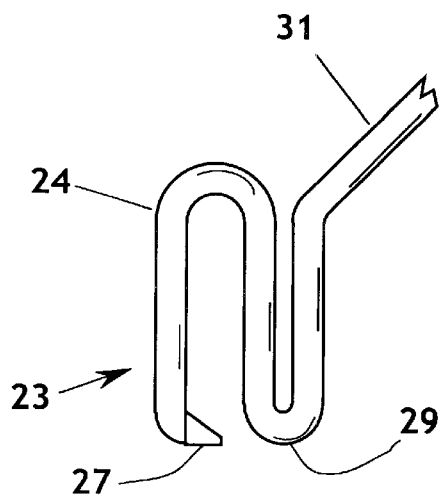
FIG. 3 is a side elevation of the improved clip-on clasp of the present invention.

Each clasp 23 further includes a bracket portion 28 designed to engage the frame 14, or, in the case of frameless spectacles, the edge portion of the ophthalmic lens of the spectacles. The bracket portion 28 includes a portion 29 extending from the inner end of the channel portion 26 and forming a U-shaped configuration therewith. A leg portion 31 extends from the portion 29 and is adapted to engage the spectacle frame 16. As shown in FIG. 3, the leg portion 31 is manufactured with a length that is more than necessary for its purpose, and is designed to be trimmed to fit the spectacle configuration. In addition, the leg portion is bendable to form a curve configuration that engages the frame edge, as shown in FIG. 2.

All portions of the clasp 23 may be formed in integral fashion from a flat strip of metal. In addition, the portions 29 and 31 may be provided with a sleeve (not shown) of plastic or the like to buffer contact with the spectacles.

It is noted that the bridge member 22 is secured to the upper convex surface of the channel portion 26, using spot welding, laser welding, adhesive, or the like. Thus the two clasps 23 at the upper edges of the two ophthalmic lenses of the spectacles are assembled by the bridge member prior to installation of the clasps. Indeed, bridge members in a range of sizes may be provided and preassembled to the clasps, and the properly dimensioned assembly may be selected to accommodate a given pair of spectacles. The bridge member 22 is a spring member having a curvature that biases the clasps 23 to impinge on the upper edges of the spectacle frame.

In addition, a pair of clasps 23' are secured to respective lower outer edge portions of the auxiliary optical elements, so that the upper and lower clasps of each element 21 grasp the respective spectacle frame portion 16, as shown in FIG. 1.

Figure 4:
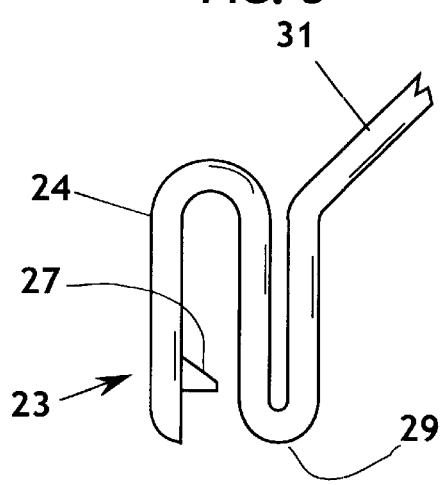
FIG. 4 is a side elevation of a further embodiment of the clip-on clasp of the present invention.
Figure 5:
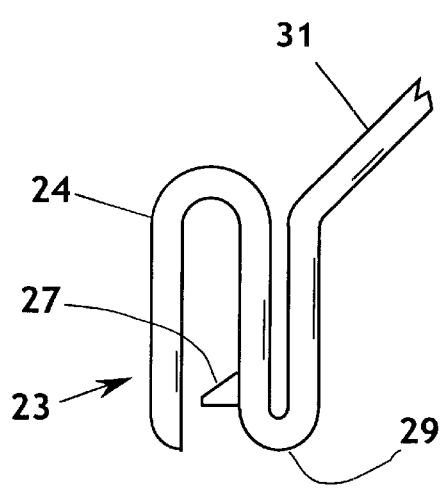
FIG. 5 is a side elevation of another embodiment of the clip-on clasp of the present invention.

With regard to FIG. 4, the projection 27 may extend from a medial internal surface of the outer finger of the channel portion 26. Likewise, as shown in FIG. 5, the projection 27 may extend from a medial internal surface of the inner finger of the channel portion 26.

The methodology for assembling the custom clip-on accessory is substantially the same as described in the patent referenced above, with the following exceptions. The bridge member is pre-assembled to the upper clasps 23, so the step of joining the clasps to the bridge is obviated. More significantly, the step regarding applying adhesive, and the subsequent step of cleaning and removing adhesive residue from the optical elements 21, are both obviated. As a result, there is less labor involved in the custom construction of the clip-on accessory to fit a particular pair of spectacles.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. An improved custom clip-on accessory for a pair of spectacles, including:
    at least one accessory optical element adapted to be superimposed on a lens of the pair of spectacles;
    at least one clasp assembly including a first portion secured to said accessory optical element and a second portion engaging the pair of spectacles;
        said first portion including a tooth-like projection for perforating and retaining said accessory optical element to said clasp assembly.

2. The improved custom clip-on accessory of claim 1, wherein said first portion includes a channel-like configuration defining an internal gap, said tooth-like projection extending into said gap.

3. The improved custom clip-on accessory of claim 2, wherein said internal gap is dimensioned to receive an edge portion of said accessory optical element and to be crimped onto said edge portion to drive said tooth-like projection into said accessory optical element.

4. The improved custom clip-on accessory of claim 2, wherein said second portion of said clasp assembly includes a leg portion extending from said channel-like portion and forming a U-shaped configuration therewith.

5. The improved custom clip-on accessory of claim 4, wherein said leg portion is bendable to be conformed to impinge on a frame portion of the spectacles.

6. The improved custom clip-on accessory of claim 5, further including a sleeve member secured about said leg portion to buffer contact with the spectacles frame.

7. The improved custom clip-on accessory of claim 1, further including a first pair of said clasp assemblies, each secured to a respective one of a pair of said accessory optical elements.

8. The improved custom clip-on accessory of claim 7, further including a bridge member extending between said first pair of clasp assemblies and permanently joined thereto.

9. The improved custom clip-on accessory of claim 8, wherein said bridge member includes opposed ends, each end secured to an outer surface of a respective one of said first pair of clasp assemblies.

10. The improved custom clip-on accessory of claim 7, further including a second pair of said clasp assemblies, said first pair of clasp assemblies being secured to respective upper edge portions of said accessory optical elements, and said second pair of clasp assemblies being secured to respective lower edge portions of said accessory optical elements.

11. The improved custom clip-on accessory of claim 10, further including a bridge member extending between said first pair of clasp assemblies.

12. The improved custom clip-on accessory of claim 11, wherein said bridge member is permanently secured to said first pair of clasp assemblies.

13. An improved custom clip-on accessory for a pair of spectacles, including:

a pair of accessory optical elements adapted to be superimposed on the lenses of a pair of spectacles;

a first pair of clasp assemblies, each clasp assembly including a first portion secured to a respective one of said pair of accessory optical elements;

said first portion including a tooth-like projection for perforating and retaining each clasp assembly to the respective accessory optical element;

each clasp assembly including a second portion for engaging the spectacles, said second portion including a leg extending from said first portion and configured to impinge on the frame of the spectacles; and, a bridge member extending between said first pair of clasp assemblies and permanently secured thereto.

14. The improved custom clip-on accessory of claim 13, wherein said first portion includes a channel-like configuration defining an internal gap, said tooth-like projection extending into said gap.

15. The improved custom clip-on accessory of claim 14, further including a second pair of said clasp assemblies, said first pair of clasp assemblies being secured to respective upper edge portions of said accessory optical elements, and said second pair of clasp assemblies being secured to respective lower edge portions of said accessory optical elements.

\* \* \* \* \*